US009337987B1

(12) United States Patent
Choi et al.

(10) Patent No.: US 9,337,987 B1
(45) Date of Patent: May 10, 2016

(54) AUTONOMOUS DENIAL OF TRANSMISSION IN DEVICE WITH COEXISTING COMMUNICATION TECHNOLOGIES

(71) Applicant: MARVELL INTERNATIONAL LTD., Hamilton (BM)

(72) Inventors: Jihwan P. Choi, Daegu (KR); Mingguang Xu, Sunnyvale, CA (US); Hui-Ling Lou, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 49 days.

(21) Appl. No.: 14/109,246

(22) Filed: Dec. 17, 2013

Related U.S. Application Data

(60) Provisional application No. 61/738,289, filed on Dec. 17, 2012.

(51) Int. Cl.
| | |
|---|---|
| *H04B 15/00* | (2006.01) |
| *H04W 28/04* | (2009.01) |
| *H04W 72/08* | (2009.01) |
| *H04W 72/12* | (2009.01) |
| *H04L 5/00* | (2006.01) |

(52) U.S. Cl.
CPC ............. *H04L 5/0078* (2013.01); *H04W 28/04* (2013.01); *H04W 72/082* (2013.01)

(58) Field of Classification Search
CPC .... H04B 15/00; H04W 28/04; H04W 72/082; H04W 72/1215
See application file for complete search history.

(56) References Cited

U.S. PATENT DOCUMENTS

| | | | |
|---|---|---|---|
| 6,614,797 | B1 | 9/2003 | Hippelainen |
| 7,215,659 | B1 | 5/2007 | Chen et al. |
| 7,277,692 | B1 | 10/2007 | Jones et al. |
| 8,094,597 | B1 | 1/2012 | Chhabra et al. |
| 8,121,068 | B2 | 2/2012 | Zhu |
| 8,705,427 | B1 | 4/2014 | Chhabra et al. |
| 9,119,025 | B1 | 8/2015 | Chhabra et al. |
| 2002/0136233 | A1 | 9/2002 | Chen et al. |
| 2002/0181492 | A1 | 12/2002 | Kasami et al. |

(Continued)

OTHER PUBLICATIONS

3GPP TR 36.816 V11.2.0, "3rd Generation Partnership Project; Technical Specification Group Radio Access Network; Evolved Universal Terrestrial Radio Access (E-UTRA); Study on Signaling and Procedure for Interference Avoidance for In-Device Coexistence (Release 11)", Dec. 2011, 44 pages.

(Continued)

*Primary Examiner* — Brandon Renner

(57) ABSTRACT

A method includes determining a first measure of a benefit of disallowing transmission during a time period within a time frame. The benefit of disallowing transmission includes an immediate benefit of disallowing transmission during the time period, and a future benefit of having, for use in a subsequent portion of the time frame, a decremented number of opportunities to disallow transmission. The method also includes determining a second measure of a benefit of not disallowing transmission during the time period. The benefit of not disallowing transmission includes an immediate benefit of not disallowing transmission during the time period, and a future benefit of having, for use in the subsequent portion of the time frame, a non-decremented number of opportunities to disallow transmission. The method also includes determining whether to disallow transmission during the time period at least in part by comparing the first measure to the second measure.

20 Claims, 5 Drawing Sheets

(56) References Cited

U.S. PATENT DOCUMENTS

| | | | |
|---|---|---|---|
| 2003/0093513 | A1 | 5/2003 | Hicks et al. |
| 2005/0059347 | A1 | 3/2005 | Haartsen |
| 2007/0153749 | A1 | 7/2007 | Waxman |
| 2008/0279163 | A1 | 11/2008 | Desai |
| 2009/0245216 | A1 | 10/2009 | Banerjea et al. |
| 2011/0097998 | A1 | 4/2011 | Ko et al. |
| 2012/0164948 | A1* | 6/2012 | Narasimha et al. ........... 455/63.1 |
| 2013/0114583 | A1* | 5/2013 | Park et al. ...................... 370/338 |
| 2013/0194938 | A1* | 8/2013 | Immonen et al. .............. 370/252 |
| 2014/0126552 | A1* | 5/2014 | Dayal et al. .................... 370/336 |

OTHER PUBLICATIONS

Chen, "Home Network Basis: Transmission Environments and Wired/Wireless Protocols," *Prentice Hall*, pp. 1-26 (Jul. 2003).

Golmie et al., "Bluetooth and WLAN Coexistence: Challenges and Solutions," IEEE Wireless Comm., vol. 10, No. 6, pp. 22-29, (2003).

Hiertz et al., "The IEEE 802.11 Universe," *IEEE Communications Magazine*, pp. 62-70, (Jan. 2010).

"How 802.11b/g Wireless WLAN and Bluetooth Can Play; Without Standards-Based Solutions, ICs Must Referee Spectrum Rivalry," Philips Electronics, 5 pages (Sep. 2005).

Quinnell, "WiFi and Bluetooth Fight for Bandwidth," EDN, 4 pages (Aug. 4, 2005).

Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, (Nov. 4, 2004).

"Wi-Fi Display Technical Specification Version 1.0.0", Wi-Fi Alliance® Technical Committee, Wi-Fi Display Technical Task Group, 149 pages (Aug. 24, 2012).

"Wi-Fi Peer-to-Peer (P2P) Technical Specification, Version 1.00", Wi-Fi Alliance, pp. 1-135, Dec. 1, 2009.

"WiFi$^{TM}$ and Bluetooth$^{TM}$—Interference Issues," HP, 6 pages (Jan. 2002).

Wojtiuk, "Bluetooth and WiFi Integration: Solving Co-Existence Challenges," RF Design, 4 pages (Oct. 2004).

IEEE Std 802.11$^{TM}$ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

U.S. Appl. No. 12/260,867, Chhabra et al., "Method and Apparatus for Coexistent WLAN and PAN Communication with Intelligent PAN Slot Suppression," filed Oct. 29, 2008.

U.S. Appl. No. 12/260,875, Chhabra et al., "Method and Apparatus for Coexistent Wireless and Bluetooth Communication Using Power Save Polling," filed Oct. 29, 2008.

U.S. Appl. No. 12/260,995, Chhabra et al., "Method and Apparatus for Using Power Management Mode to Regulate Data Transmission when a Bluetooth Network and a Wireless Local Area Network Coexist," filed Oct. 29, 2008.

U.S. Appl. No. 14/136,860, Choi et al., "Method and System for Mitigating Interference between different Radio Access Technologies Utilized by a Communication Device," filed Dec. 20, 2013.

\* cited by examiner

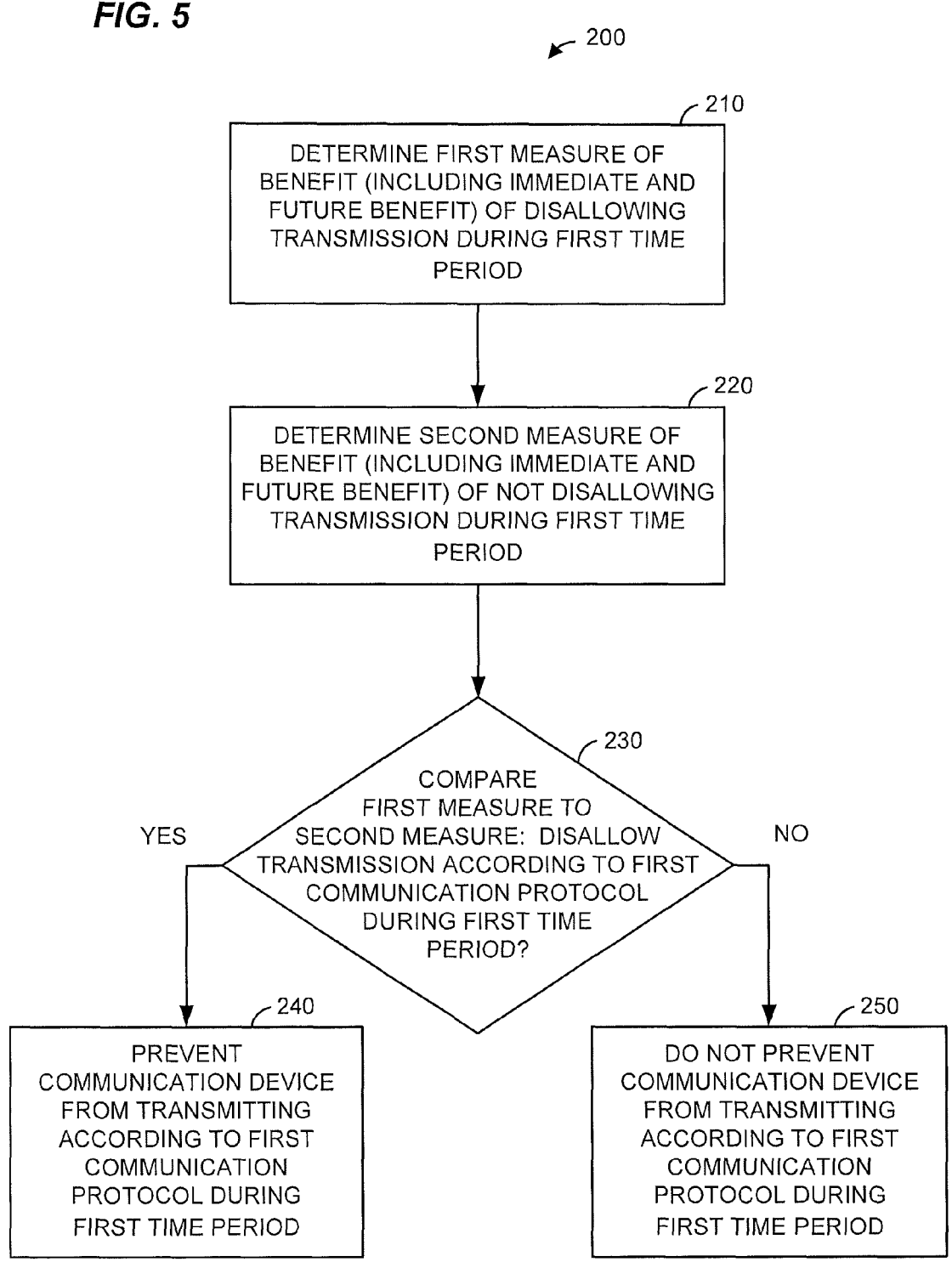

AUTONOMOUS DENIAL OF TRANSMISSION IN DEVICE WITH COEXISTING COMMUNICATION TECHNOLOGIES

CROSS-REFERENCES TO RELATED APPLICATION

This claims the benefit of U.S. Provisional Patent Application No. 61/738,289, entitled "Method of LTE Uplink Autonomous Denial for In-Device Coexistence (IDC)" and filed on Dec. 17, 2012, the disclosure of which is hereby incorporated herein by reference.

FIELD OF TECHNOLOGY

The present disclosure relates generally to communication networks and, more particularly, to methods and systems for mitigating interference between different communication technologies utilized by a communication device.

BACKGROUND

Wireless communication networks such as wireless wide area networks (WWAN), wireless local area networks (WLAN), and wireless personal area networks (WPAN) have become increasingly common, with different types of networks (and the corresponding wireless technologies) frequently coexisting in a single communication device. For example, user devices (e.g., mobile handsets) designed to operate using a cellular technology (e.g., Long Term Evolution (LTE) cellular technology) are increasingly designed to also use other wireless technologies, such as Wi-Fi and/or Bluetooth, that operate in the same or nearby frequency bands. Moreover, communications utilizing the various wireless technologies often occur simultaneously. For example, a user device may transmit data on a cellular uplink channel while receiving data via a Bluetooth interface. As a result of this increasing overlap, interference between different wireless technologies has become a significant problem.

SUMMARY

In an embodiment, a method, implemented in a communication device configured to transmit signals conforming to a first communication protocol, of determining when to disallow transmissions according to the first communication protocol, wherein a number of times that transmissions can be disallowed in a time frame is limited, includes determining, at one or more processors, a first measure of a benefit of disallowing transmission during a first time period within the time frame. The benefit of disallowing transmission during the first time period includes (i) an immediate benefit of disallowing transmission during the first time period, and (ii) a future benefit of having, for use in a subsequent portion of the time frame, a decremented number of opportunities to disallow transmission. The method also includes determining, at one or more processors, a second measure of a benefit of not disallowing transmission during the first time period. The benefit of not disallowing transmission during the first time period includes (i) an immediate benefit of not disallowing transmission during the first time period, and (ii) a future benefit of having, for use in the subsequent portion of the time frame, a non-decremented number of opportunities to disallow transmission. The non-decremented number is greater than the decremented number. The method also includes determining, at one or more processors, whether to disallow transmission according to the first communication protocol during the first time period at least in part by comparing the first measure to the second measure, and in response to determining to disallow transmission during the first time period, preventing, with one or more processors, the communication device from transmitting according to the first communication protocol during the first time period.

In another embodiment, a communication device includes a first transceiver configured to transmit signals conforming to a first communication protocol, a second transceiver configured to receive signals conforming to a second communication protocol different than the first communication protocol, and an arbiter processor unit coupled to (i) the first transceiver and (ii) the second transceiver. The arbiter processor unit is configured to determine when to disallow transmissions according to the first communication protocol, and a number of times that the arbiter processor unit can disallow transmissions in a time frame is limited. The arbiter processor unit is configured to determine when to disallow transmissions by being configured to determine a first measure of a benefit of disallowing transmission during a first time period within the time frame. The benefit of disallowing transmission during the first time period includes (i) an immediate benefit of disallowing transmission during the first time period, and (ii) a future benefit of having, for use in a subsequent portion of the time frame, a decremented number of opportunities to disallow transmission, determine a second measure of a benefit of not disallowing transmission during the first time period. The benefit of not disallowing transmission during the first time period includes (i) an immediate benefit of not disallowing transmission during the first time period, and (ii) a future benefit of having, for use in the subsequent portion of the time frame, a non-decremented number of opportunities to disallow transmission, and the non-decremented number is greater than the decremented number. The arbiter processor unit is also configured to determine when to disallow transmissions by being configured to, determine whether to disallow transmission according to the first communication protocol during the first time period at least by comparing the first measure to the second measure, and, when determining to disallow transmission during the first time period, to prevent the first transceiver from transmitting according to the first communication protocol during the first time period.

In another embodiment, a tangible, non-transitory computer-readable medium stores instructions for determining when to disallow transmissions according to a first communication protocol. A number of times that transmissions can be disallowed in a time frame is limited. The instructions, when executed by one or more processors, cause the one or more processors to determine a first measure of a benefit of disallowing transmission during a first time period within the time frame. The benefit of disallowing transmission during the first time period includes (i) an immediate benefit of disallowing transmission during the first time period, and (ii) a future benefit of having, for use in a subsequent portion of the time frame, a decremented number of opportunities to disallow transmission. The instructions also cause the one or more processors to determine a second measure of a benefit of not disallowing transmission during the first time period. The benefit of not disallowing transmission during the first time period includes (i) an immediate benefit of not disallowing transmission during the first time period, and (ii) a future benefit of having, for use in the subsequent portion of the time frame, a non-decremented number of opportunities to disallow transmission, and the non-decremented number is greater than the decremented number. The instructions also cause the one or more processors to determine whether to disallow transmission according to the first communication protocol during the first time period at least by comparing the first measure to the second measure, and, when determining to disallow transmission during the first time period, to prevent a communication device from transmitting according to the first communication protocol during the first time period.

BRIEF DESCRIPTION OF THE DRAWINGS

FIG. 5 is a flow diagram of an example method of determining when to disallow transmissions of signals conforming to a first communication protocol, according to an embodiment.

DETAILED DESCRIPTION

Figure 1:
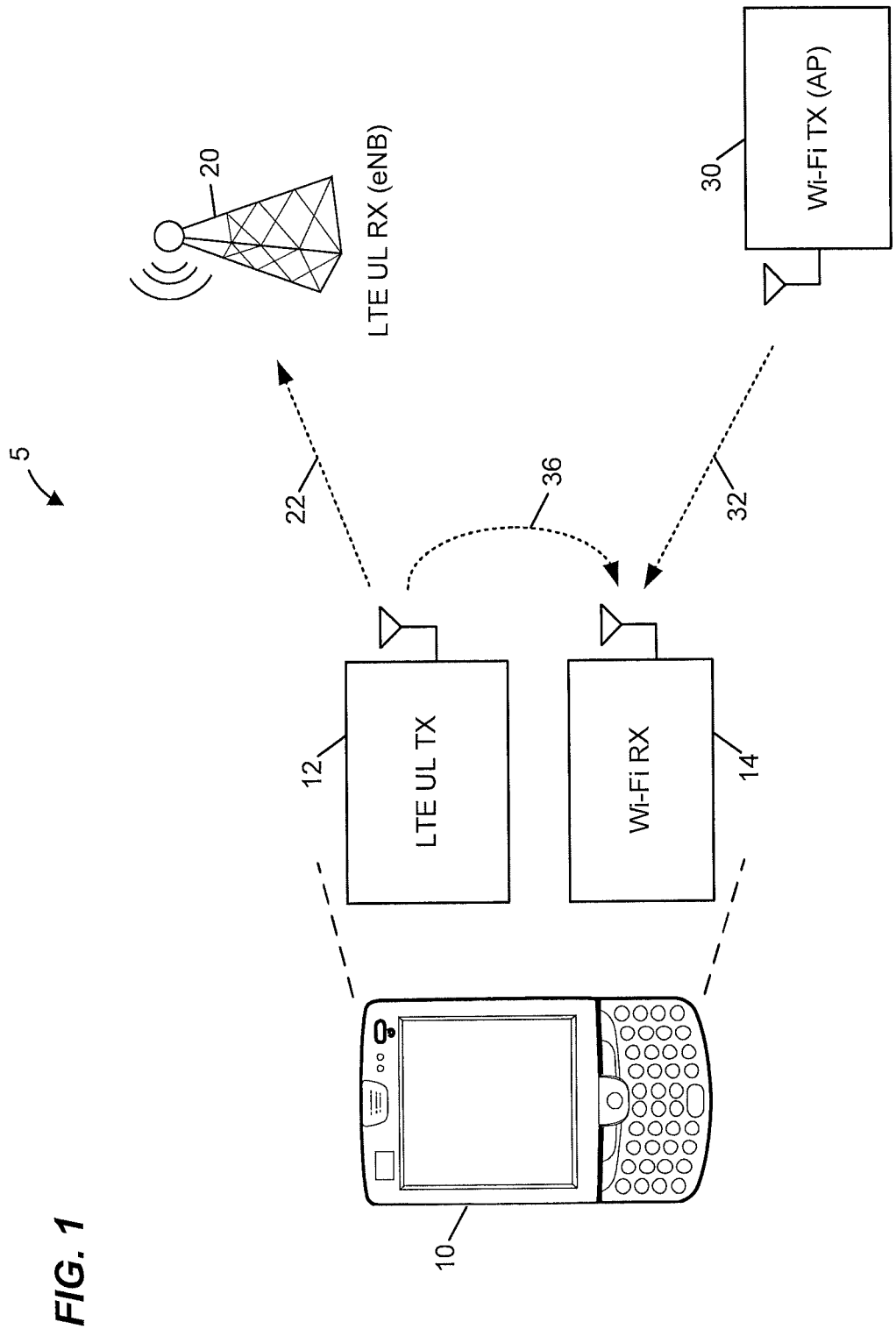
FIG. 1 is a block diagram of an example system in which a user device supports multiple, coexisting wireless communication technologies.

FIG. 1 is a block diagram of an example system 5 in which a user device 10 supports multiple, coexisting wireless communication technologies. In the example system 5, the user device 10 is configured to communicate according to both a cellular, Long Term Evolution (LTE) protocol and a wireless local area network (WLAN), Wi-Fi protocol. To support these protocols, the user device 10 includes an LTE transmitter 12 configured to generate and transmit signals conforming to the LTE protocol and a Wi-Fi receiver 14 configured to receive and decode signals conforming to the Wi-Fi protocol. The LTE transmitter 12 transmits LTE uplink (UL) signals to an LTE receiver 20 (e.g., an eNodeB, or eNB) over a wireless link 22, and the Wi-Fi receiver 14 receives Wi-Fi signals from a Wi-Fi transmitter (e.g., access point, or AP) 30 over a wireless link 32.

In some scenarios, the LTE transmitter 12 transmits data over wireless link 22 at least in part simultaneously with the reception of data by the Wi-Fi receiver 14 over wireless link 32. Moreover, in some scenarios, the bands or channels utilized by the LTE and Wi-Fi communications are adjacent in frequency. If communications using the two wireless technologies are simultaneous, and are sufficiently close in frequency, the physical proximity of the antennas on the user device 10 can lead to a high level of interference that may significantly degrade reliability and throughput. For example, transmission of data over the LTE wireless link 22 results in interference via path 36 that can significantly degrade reliability and throughput of the Wi-Fi wireless link 32. Interference can also occur in the opposite direction (e.g., a Wi-Fi transmitter (not shown) in user device 10 may cause interference at an LTE receiver (not shown) in user device 10), or in communications from or between other wireless technologies of the user device 10, in some systems and scenarios.

Recently, it has been specified that, for an "in-device coexistence" (IDC) user equipment (UE) such as the user device 5 of FIG. 1, an eNB such as LTE receiver 20 should give the UE the ability to autonomously deny LTE uplink transmissions during particular subframes in order to reduce interference, at those times, to 2.4 GHz ISM band (e.g., Wi-Fi or Bluetooth) signals being received by the UE. Under this specification, the eNB regulates the maximum average rate of LTE uplink transmission denials that can be made by the UE, thereby limiting the number of LTE subframes, within a particular time period, in which LTE uplink transmission may be denied.

Figure 2:
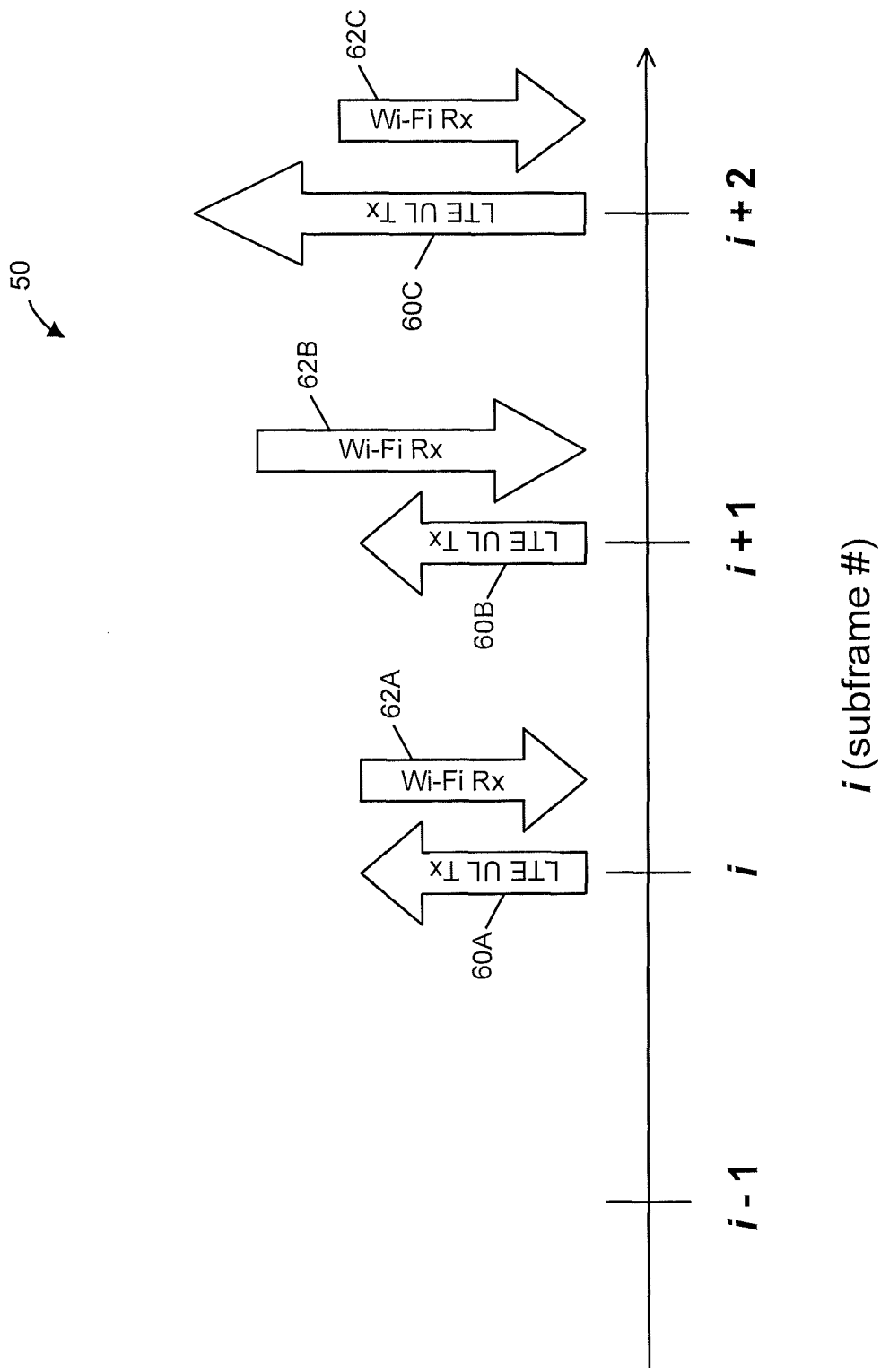
FIG. 2 is a diagram of an example schedule of transmitting and receiving signals of different communication protocols.

The decision, at the UE, of when to deny LTE uplink transmission may be viewed as a resource allocation problem. For example, if the eNB allows a UE only n opportunities to deny an LTE uplink transmission during a subframe over the course of p subframes (where p>n), the problem becomes how to allocate each of the n transmission denials across the p subframes. In particular, for each subframe, the problem may be framed as whether to use one of the n denial opportunities in that subframe, or to instead save the denial for a potentially more critical time in the future. The problem may be better understood by considering an example, such as the example schedule 50 shown in FIG. 2. In the example schedule 50, LTE uplink signal 60A is expected to be transmitted, or to be available for transmission, in a first subframe (subframe i), LTE uplink signal 60B is expected to be transmitted, or to be available for transmission, in a second subframe (subframe i+1), and LTE uplink signal 60C is expected to be transmitted, or to be available for transmission, in a third subframe (subframe i+2). Also in the example schedule 50, Wi-Fi signal 62A is expected to be received in subframe i, Wi-Fi signal 62B is expected to be received in subframe i+1, and Wi-Fi signal 62C is expected to be received in subframe i+2. The relative sizes of the arrows corresponding to the LTE uplink signals 60A-60C and Wi-Fi signals 62A-62C represent the importance associated with transmitting (or receiving) the respective LTE uplink signal (or Wi-Fi signal) during the indicated subframe. For example, the larger arrow corresponding to LTE uplink signal 60C and subframe i+2 indicates that it is more "important" to transmit LTE uplink signal 60C at subframe i+2 than it is to transmit LTE uplink signal 60A at subframe i or LTE uplink signal 60B at subframe i+1 (i.e., a larger benefit/utility is associated with the former than the latter). As another example, the larger arrow corresponding to Wi-Fi signal 62B and subframe i+1 indicates that it is more important to receive Wi-Fi signal 62B at subframe i+1 than it is to receive Wi-Fi signal 62A at subframe i or Wi-Fi signal 62C at subframe i+2. The sizes of the various arrows in FIG. 2 may represent the importance of the signals themselves (e.g., priorities of the signals scheduled for those subframes), and/or how good channel conditions are expected to be (e.g., estimated throughputs) during the respective subframes.

If considered one subframe at a time, and without any consideration of future subframes, the decision whether to deny an LTE uplink transmission can be relatively straightforward. This "short-sighted" approach, however, may fail to provide satisfactory results when more critical Wi-Fi signals (and/or better Wi-Fi channel conditions, etc.) are expected in the future. Consider, for example, a simple scenario in which only a single LTE uplink transmission denial opportunity is allowed, and in which the short-sighted approach decides to deny the LTE uplink signal 60A at subframe i. While this may provide some near-term benefit (by allowing Wi-Fi signal 62A to be received without interference from LTE uplink signal 60A), that benefit is quickly overshadowed by the inability to deny transmission of the LTE uplink signal 60B at subframe i+1, at a time when it is more important that Wi-Fi signal 62B be received.

In embodiments described below, a framework is provided for autonomous denial of LTE uplink transmissions or, more generally, for denial of transmissions according to a particular communication protocol. Under this framework, in some embodiments, dynamic programming techniques are used to make decisions as to whether to deny a transmission in a particular time period (e.g., in an LTE subframe) by considering not only the immediate benefits of denying or allowing a transmission in a particular time period, but also the future benefits of denying or allowing that transmission. Dynamic programming is an optimization technique in which a complex problem is transformed into a sequence of relatively simple problems. Generally, an optimization problem is solved in multiple "stages" each having one or more possible "states," with the solution for one stage being used in a recursive manner to help determine the solution for the next stage. A problem can only be solved using dynamic programming if the problem is formulated such that the problem exhibits certain properties (e.g., "optimal substructure"), and it is generally difficult to determine whether, and how, an optimization problem can be structured in order to have the requisite properties. In some embodiments, the inherent properties of dynamic programming provide efficient utilization of processing resources. Moreover, in some embodiments, the consideration of both immediate and future benefits allows an optimal (or near-optimal) allocation of a limited number of transmission denial opportunities within a particular time frame.

In some embodiments, the transmission denial techniques described below are implemented in a user device (such as user device 10 of FIG. 1, for example) that is configured to operate according to LTE and Wi-Fi communication protocols. In other embodiments, however, the techniques are instead implemented in a user device configured to operate according to other communication protocols. In one embodiment, for example, the techniques are implemented in a user device that is similar to user device 10 of FIG. 1, but with LTE transmitter 12 replaced by a Universal Mobile Telecommunications System (UMTS), WiMax, or other suitable cellular, wireless wide area network (WWAN) or other wireless technology transmitter, and/or with Wi-Fi receiver 14 replaced by a Bluetooth, wireless USB, or other suitable WLAN, wireless personal area network (WPAN) or other wireless technology receiver. For ease of explanation, however, the following description refers to an embodiment the same as or similar to that shown in FIG. 1, with the user device allocating a limited number of denial opportunities within a set of LTE subframes in order to reduce interference to Wi-Fi reception at the user device.

In one embodiment, a dynamic programming approach utilizes a function $U_i(k)$, which represents the total utility/benefit of having k remaining LTE uplink transmit denial opportunities at the i-th of p subframes. In an embodiment, the function $U_i(k)$ has the form:

$$U_i(k) = \max\{U_{i+1}(k) + R_i(\text{no denial}), U_{i+1}(k-1) + R_i(\text{denial})\}$$ (Equation 1)

In Equation 1, $R_i(\text{no denial})$ is the immediate benefit of not denying LTE uplink transmission in subframe i, $R_i(\text{denial})$ is the immediate benefit of denying LTE uplink transmission in subframe i, $U_{i+1}(k)$ is the future benefit of having k remaining LTE uplink transmit denial opportunities at the (i+1)-th subframe, and $U_{i+1}(k-1)$ is the future benefit of having k-1 remaining LTE uplink transmit denial opportunities at the (i+1)-th subframe. As used herein, a benefit of using, or not using, a transmit denial opportunity in a particular time period (e.g., subframe) is referred to as an "immediate benefit" or a "future benefit," depending on which time period is currently under consideration. In one embodiment, for example, and referring back to FIG. 2, the size of the arrow corresponding to Wi-Fi signal 62A (and/or the size of the arrow corresponding to LTE uplink signal 60A) impacts the "immediate benefit" of denying or not denying LTE uplink transmission when deciding whether to deny transmission at subframe whereas the sizes of the arrows corresponding to Wi-Fi signals 62B and 62C (and/or the sizes of the arrows corresponding to LTE uplink signals 60B and 60C) impact the "future benefit" of denying or not denying LTE uplink transmission when deciding whether to deny transmission at subframe i. Similarly, in an embodiment, the size of the arrow corresponding to Wi-Fi signal 62B (and/or the size of the arrow corresponding to LTE uplink signal 60B) impacts the "immediate benefit" of denying or not denying LTE uplink transmission when deciding whether to deny transmission at subframe i+1, whereas the size of the arrow corresponding to Wi-Fi signal 62C (and/or the size of the arrow corresponding to LTE uplink signal 60C) impacts the "future benefit" of denying or not denying LTE uplink transmission when deciding whether to deny transmission at subframe i+1. The term "immediate benefit" does not necessarily mean that the benefit is immediately recognized or effectuated, but rather is used to distinguish from the "future benefit" of having, in later time periods, fewer denial opportunities remaining (if a denial opportunity is used in the current time period) or a same number of denial opportunities remaining (if a denial opportunity is not used in the current time period). The types of benefits or utility that are quantified by $U_i(k)$, $R_i(\text{denial})$ and $R_i(\text{no denial})$ are discussed further below.

In some embodiments, Equation 1 is solved at each stage (e.g., each subframe) for each of multiple values of k. In one embodiment, for example, Equation 1 is solved, at each stage, for each value of k from 0 to n, where n is the maximum number of LTE uplink transmission denials allowed over the course of p subframes. In some such embodiments, however, no solution is calculated for states that are not permitted or possible. In one embodiment and scenario where n>0 denial opportunities are provided, for example, Equation 1 is only solved, at the earliest subframe (i=1), for the case of k=n, because the full number of denial opportunities will always be available at the first subframe, and Equation 1 is only solved, at the next subframe (i=2), for the cases of k=n and k=n−1 because at most one denial opportunity will have been used by the second subframe, etc.

In some embodiments in which the user device (e.g., UE) knows future traffic scheduling for LTE uplink signals and/or Wi-Fi receive signals, Equation 1 is solved for all subframes i=1 to p using backward induction. In one embodiment, for example, $U_p(k)$ is solved first by using one or more boundary conditions, such as $U_{p+1}(k)=0$ for all k (i.e., the benefit of having any remaining transmit denial opportunities left after the period of p subframes has expired is assumed to be zero). Next, $U_{p-1}(k)$ is solved, and then $U_{p-2}(k)$, and so on, in a recursive manner, until $U_i(k)$ is solved for all subframes i. In one such embodiment, Equation 1 is only used, at each stage/subframe, for values of k that are greater than zero, with a simplified equation instead being used for the case of k=0 (because the benefit of a denial should not be considered if no denial opportunities remain). In one embodiment, for example, Equation 1 is used at each stage/subframe for k>1, but the following equation is used at each stage/subframe for k=0:

$$U_i(0) = U_{i+1}(0) + R_i(\text{no denial})$$ (Equation 2)

Once $U_i(k)$ has been solved, for all stages/subframes i=1 to p, and for each state k (or for each permissible state k), in an embodiment, a decision of whether to deny or not deny is made for each subframe i. In an embodiment, the decision is made by comparing a total (immediate plus future) benefit of using a denial at subframe i with a total benefit of saving the denial for future use, and selecting the option with the higher total benefit. To this end, in an embodiment, the decision of whether to deny LTE uplink transmission at subframe i is made by comparing a first quantity $U_{i+1}(k)+R_i$(no denial) with a second quantity $U_{i+1}(k-1)+R_i$(denial). In this embodiment, the user device does not deny the transmission at subframe i if the first quantity is greater than the second quantity (or, in some embodiments, if the first quantity is greater than or equal to the second quantity), but does deny the transmission at subframe i if the second quantity is greater than the first quantity (or, in some embodiments, if the second quantity is greater than or equal to the first quantity). In an embodiment, the comparison is made for each subframe in a window of p subframes in order to generate a denial decision at each of the p subframes.

Figure 3:
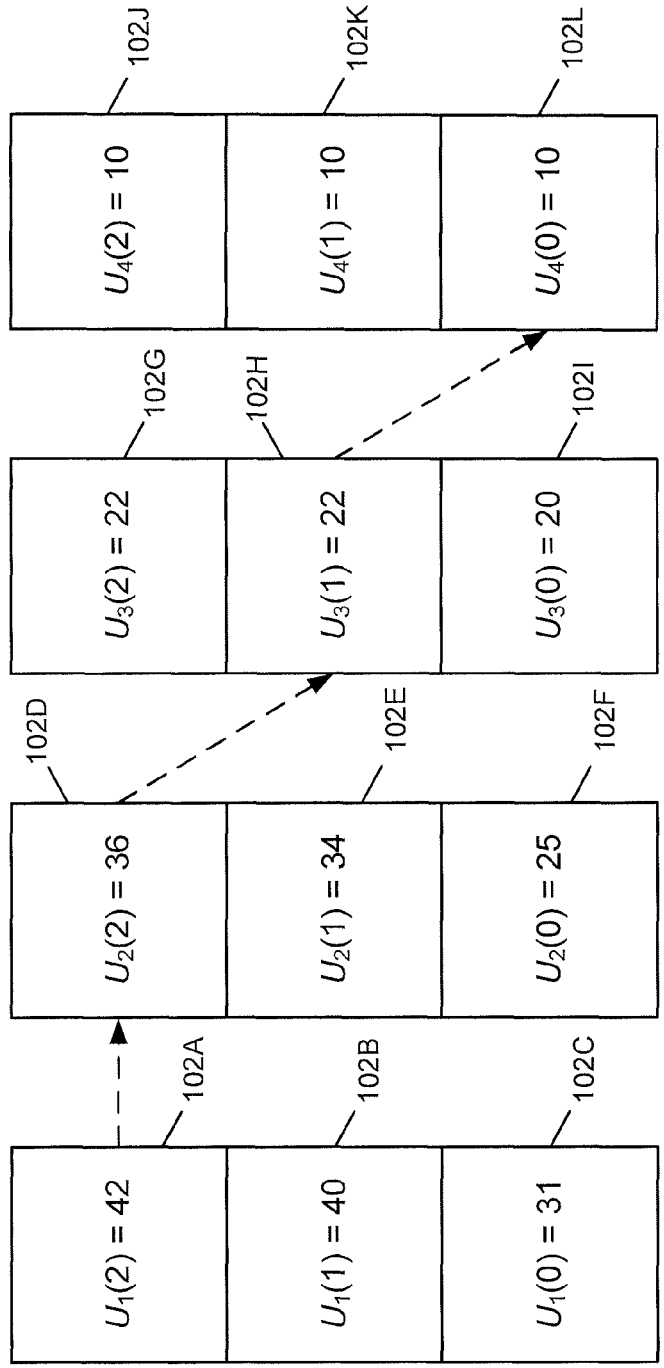
FIG. 3 is a diagram of an example solution that specifies when to disallow LTE uplink transmissions over a period of multiple subframes, according to an embodiment and scenario.

FIG. 3 is a diagram of an example solution 100 that specifies when to disallow LTE uplink transmissions over a period of multiple subframes, according to one embodiment and scenario. In an embodiment, the solution 100 is arrived at by calculations in a user device such as user device 10 of FIG. 1, for example. For illustration purposes, the example solution 100 corresponds to a relatively simple problem/scenario, with only four subframes (i.e., p=4) in which to allocate two denial opportunities (i.e., n=2). In this example embodiment and scenario, the following values of $R_i$(denial) and $R_i$(no denial) are associated with each subframe is

TABLE 1

| I | 1 | 2 | 3 | 4 |
|---|---|---|---|---|
| $R_i$(denial) | 7 | 14 | 12 | 9 |
| $R_i$(no denial) | 6 | 5 | 10 | 10 |

In the example scenario of FIG. 3, each of boxes 102A-102L represents a stage/state combination, where the stage corresponds to the subframe number (i) and the state corresponds to the number (k) of LTE uplink transmission denial opportunities that remain at the beginning of subframe i. Thus, for example, box 102A corresponds to the first subframe for the case of k=2 (i.e., two denial opportunities remain), box 102D corresponds to the first subframe for the case of k=1 (i.e., one denial opportunity remains), etc.

Using backward induction, in an embodiment, $U_4(k)$ is calculated first, for each k from k=0 to n (i.e., 0 to 2). Using Equations 1 and 2, and with the boundary condition $U_5(k)=0$ for all k, in an embodiment, the values of $U_4(k)$ are calculated as follows:

$$U_4(0)=U_5(0)+R_4(\text{no denial})=0+10=10 \quad \text{(Equation 3)}$$

$$U_4(1)=\max\{U_5(1)+R_4(\text{no denial}),U_5(0)+R_4(\text{denial})\}= \max\{0+10,0+9=\max 10,9=10 \quad \text{(Equation 4)}$$

$$U_4(2)=\max\{U_5(2)+R_4(\text{no denial}),U_5(1)+R_4(\text{denial})\}= \max\{0+10,0+9=\max 10,9=10 \quad \text{(Equation 5)}$$

At the next earliest stage/subframe, in an embodiment, the values of $U_4(k)$ are used to calculate values of $U_3(k)$ as follows:

$$U_3(0)=U_4(0)+R_3(\text{no denial})=10+10=20 \quad \text{(Equation 6)}$$

$$U_3(1)=\max\{U_4(1)+R_3(\text{no denial}),U_4(0)+R_3(\text{denial})\}= \max\{10+10,10+12=\max 20,22=22 \quad \text{(Equation 7)}$$

$$U_3(2)=\max\{U_4(2)+R_3(\text{no denial}),U_4(1)+R_3(\text{Denial})\}= \max\{10+10,10+12=\max 20,22=22 \quad \text{(Equation 8)}$$

At the next earliest stage/subframe, in an embodiment, the values of $U_3(k)$ are used to calculate values of $U_2(k)$ as follows:

$$U_2(0)=U_3(0)+R_2(\text{no denial})=20+5=25 \quad \text{(Equation 9)}$$

$$U_2(1)=\max\{U_3(1)+R_2(\text{no denial}),U_3(0)+R_2(\text{denial})\}= \max\{22+5,20+14=\max 27,34=34 \quad \text{(Equation 10)}$$

$$U_2(2)=\max\{U_3(2)+R_2(\text{no denial}),U_3(1)+R_2(\text{denial})\}= \max\{22+5,22+14=\max 27,36=36 \quad \text{(Equation 11)}$$

Finally, at the next earliest (i.e., first) stage/subframe, in an embodiment, the values of $U_2(k)$ are used to calculate values of $U_1(k)$ as follows:

$$U_1(0)=U_2(0)+R_1(\text{no denial})=25+6=31 \quad \text{(Equation 12)}$$

$$U_1(1)=\max\{U_2(1)+R_1(\text{no denial}),U_2(0)+R_1(\text{denial})\}= \max\{34+6,25+7=\max 40,32=40 \quad \text{(Equation 13)}$$

$$U_1(2)=\max\{U_2(2)+R_1(\text{no denial}),U_2(1)+R_1(\text{denial})\}= \max\{36+6,34+7=\max 42,41=42 \quad \text{(Equation 14)}$$

In an embodiment, each calculated value of $U_i(k)$ is stored in a memory, and then recalled from the memory when needed for future calculations, such that it is not necessary to calculate the same quantity multiple times. In one embodiment, for example, the value of $U_4(0)$ (i.e., the value 10) is stored in memory after being calculated in Equation 3, and is recalled from the memory for use in the calculations of Equations 6 and 7, and the value of $U_4(1)$ (i.e., also the value 10) is stored in the memory after being calculated in Equation 4, and is recalled from the memory for use in the calculations of Equations 7 and 8, etc.

It is seen in FIG. 3 that the example solution 100 results in a greatest total benefit (42) at box 102A, which corresponds to two transmit opportunities being available at the outset (i=1). This is intuitively obvious, as there is no possible down-side (in this embodiment/example) in having fewer than the maximum number of denial opportunities at the beginning of the window of p subframes. From that starting point (i=1, k=2), in an embodiment, the decision of whether to deny LTE uplink transmission at subframe i is made by denying transmission only if the quantity $U_{i+1}(k-1)+R_i$(denial) is greater than (or greater than or equal to) the quantity $U_{i+1}(k)+R_i$(no denial). In an embodiment, each of these sums is also stored in memory after being calculated in Equations 3 through 14, above.

Using this example decision criterion, and starting at box 102A with k=2 at subframe i=1, the decision at subframe i=1 is made by comparing $U_2(1)+R_1$(denial)=34+7=41 with the quantity $U_2(2)+R_1$(no denial)=36+6=42. Because the latter quantity is greater, the decision is made not to deny transmission at the first subframe (i=1), meaning that k will still be equal to 2 at the second subframe (i=2). Next, at box 102D, the decision at subframe i=2 is made by comparing $U_3(1)+R_2$ (denial)=22+14=36 with the quantity $U_3(2)+R_2$ (no denial)= 22+5=27. Because the former quantity is greater, the decision is made to deny transmission at the second subframe (i=2), causing k to decrement to k=1 for the third subframe (i=3). Next, at box 102H, the decision at subframe i=3 is made by comparing $U_4(0)+R_3$ (denial)=10+12=22 with the quantity $U_4(1)+R_3$ (no denial)=10+10=20. Because the former quantity is greater, the decision is made to deny transmission at the third subframe (i=3), causing k to decrement to k=0 for the fourth and final subframe (i=4). As noted above, in an embodiment, a boundary condition is established by assuming that $U_5(k)=0$ for all k. Next, at box 102L, the decision at subframe i=4 is made by comparing $U_5(-1)+R_4$ (denial)=0+ 9=9 with the quantity $U_5(0)+R_4$ (no denial)=0+10=10. Because the latter quantity is greater, the decision is made not to deny transmission at the fourth subframe (i=4). Of course, because k had already decremented to zero, there never was any possibility of denying transmission at the final subframe, in this embodiment and scenario. In some embodiments, therefore, comparisons of the above sort are not made for remaining subframes when it has already been determined that k has decremented to zero. Instead, in these embodiments, it is automatically decided/recognized that there will be no transmission denials in any remaining subframes (in the current window of p subframes) once k decrements to zero.

Moreover, in some embodiments, states that are not permitted in the example solution 100 are not calculated in order to conserve processing resources. In one embodiment in which n=2, for example, $U_i(k)$ is not calculated for at least box 102C (i=1, k=0) and box 102B (i=1, k=1). As another example, in an embodiment in which n=2 and all denial opportunities must be used within the p subframes, $U_i(k)$ is not calculated for at least box 102C (i=1, k=0), box 102B (i=1, k=1), box 102K (i=4, k=1) and box 102L (i=4, k=2).

In the example scenario of FIG. 3, the solution calculated using the technique discussed above is shown by the dashed lines/arrows. It is noted that this solution is different than the solution that would result if decisions were instead made based only on immediate, and not future, benefits. If only immediate benefits were considered (e.g., denying or not denying at subframe i based only on a comparison of $R_i$(denial) and $R_i$(no denial)), for example, the immediate benefits shown in Table I would result in denying LTE uplink transmission at subframes 1 and 2 rather than subframes 2 and 3, which would in turn result in a lower overall benefit/utility from the allocation of denial opportunities in the window of four subframes (i.e., 7+14+10+10=41, rather than 42).

In an embodiment, each window of p subframes in which n denials are allowed is fixed, with each window being adjacent to, but not overlapping, the next window of p subframes. In other embodiments, however, the window of p subframes is a moving window, whereby adjacent windows overlap each other.

The variables $R_i$(denial) and $R_i$(no denial) (and therefore $U_i(k)$) in the above examples represent different metrics according to different embodiments. In some embodiments, for example, $R_i$(denial) and $R_i$(no denial) represent throughputs that are expected based on predicted channel conditions and/or predicted traffic scheduling. In one such embodiment, $R_i$(denial) is a metric or value that increases as the expected Wi-Fi throughput during LTE subframe i increases, and/or $R_i$(no denial) is a metric or value that decreases as the expected Wi-Fi receive throughput during LTE subframe i increases (and/or as the expected LTE uplink throughput during subframe i decreases).

The various expected throughputs are estimated based on different factors, according to different embodiments. In one embodiment, for example, one or more of the Wi-Fi (and/or LTE uplink) throughputs is/are estimated based on channel conditions (e.g., signal-to-noise ratio, other scheduled communications that can cause interference, etc.) that are expected for the i-th subframe, and/or estimated based on an amount of data expected to be received by (Wi-Fi) or sent by (LTE) the user device during the i-th subframe. In one embodiment, for example, $R_i$(denial) is relatively large if Wi-Fi receive channel conditions are expected to be robust during the i-th subframe, and/or if LTE uplink channel conditions are expected to be poor during the i-th subframe, and $R_i$(no denial) is relatively large if Wi-Fi receive channel conditions are expected to be poor during the i-th subframe, and/or if LTE uplink channel conditions are expected to be robust during the i-th subframe.

Alternatively, or additionally, in an embodiment, $R_i$(denial) and $R_i$(no denial) represent measures of importance associated with the expected data/signal itself. In one such embodiment, for example, $R_i$(denial) is relatively large if a Wi-Fi signal with high priority data is expected to be received during the i-th subframe, and/or if no LTE uplink signal with high priority data is ready to be sent during the i-th subframe, and $R_i$(no denial) is relatively large if an LTE uplink signal with high priority data is ready to be sent during the i-th subframe, and/or if no Wi-Fi signal with high priority data is expected to be received during the i-th subframe.

In some embodiments, values of $R_i$(denial) and $R_i$(no denial) over the window of p subframes are based on a priori knowledge of Wi-Fi and/or LTE uplink traffic scheduling, and/or based on metrics (e.g., channel signal-to-noise ratios) that are assumed to be fixed for the duration of the window. In other embodiments, however, stochastic modeling is used to better capture the uncertainty associated with Wi-Fi and/or LTE signal prediction. In an embodiment, for example, Equations 1 and 2 are modified to account for probability distributions associated with traffic scheduling and/or channel conditions.

Figure 4:
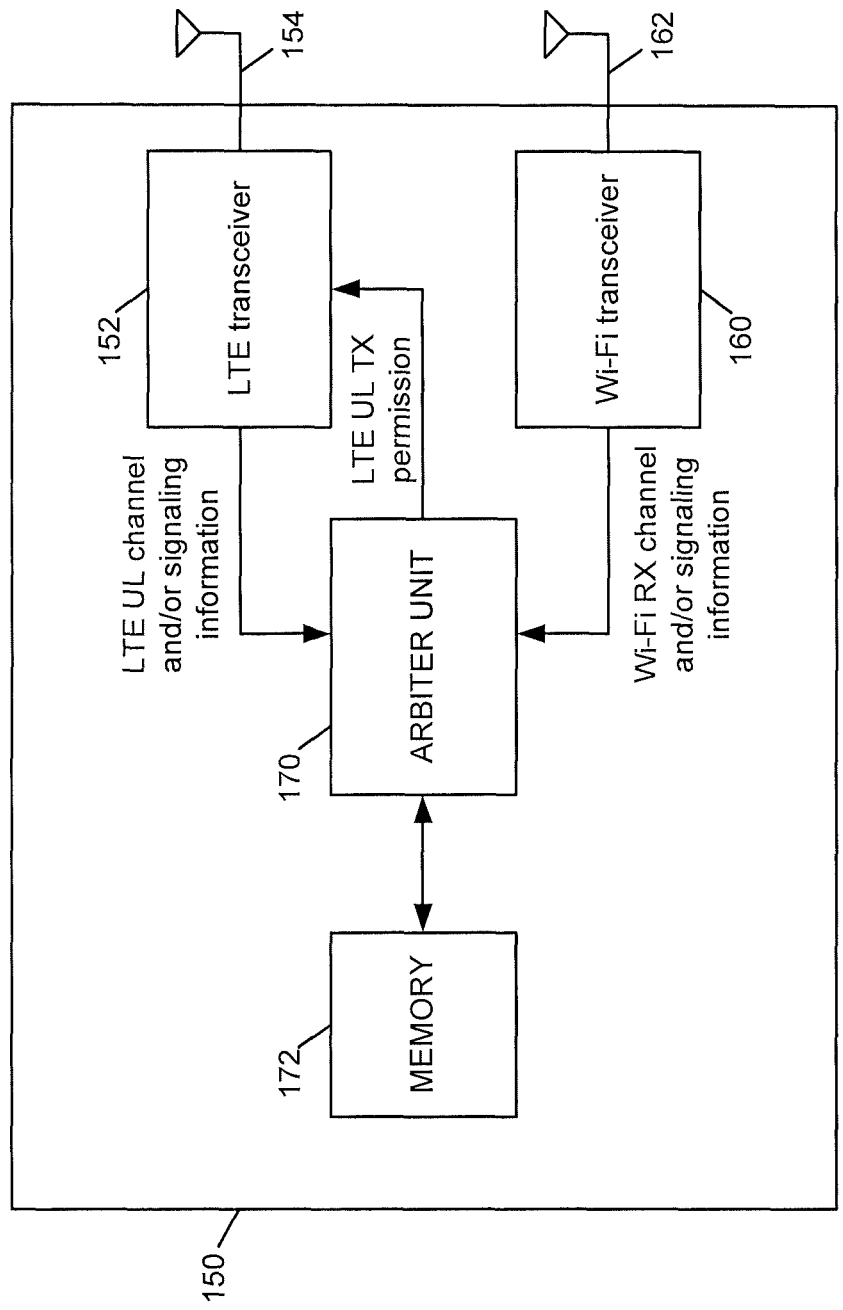
FIG. 4 is a block diagram of an example user device configured to implement a technique for determining when to disallow LTE uplink transmissions, according to an embodiment.

FIG. 4 shows how the autonomous transmission denial techniques described above are applied to an example user device 150, which provides a slightly more detailed view of user device 10 in FIG. 1, according to one embodiment. To support LTE communications with an eNB, and Wi-Fi communications with an AP, the user device 150 includes an LTE transceiver 152 coupled to a set of one or more antennas 154 and a Wi-Fi transceiver 160 coupled to a set of one or more antennas 162. As noted above in connection with FIG. 1, in some embodiments the user device 150 supports other coexisting communication technologies, instead of, or in addition to, LTE and/or Wi-Fi (e.g., UMTS, WiMax, Bluetooth, etc.). The user device 150 also includes an arbiter unit 170 coupled to the LTE transceiver 152 and Wi-Fi transceiver 160, and a memory 172 coupled to the arbiter unit 170. In some embodiments, the LTE transceiver 152, Wi-Fi transceiver 160, and/or arbiter unit 170 is/are implemented in whole or in part by one or more physical processors within the user device 150. In one embodiment, for example, one or more of the physical processors (e.g., processors of LTE transceiver 152 and/or Wi-Fi transceiver 160) include(s) one or more hardware processors, such as integrated circuits (e.g., application specific integrated circuits (ASICs), programmable logic devices, etc.) or a collection of discrete hardware components, for example. In another embodiment, one or more of the physical processors (e.g., a processor of arbiter unit 170) is/are configured to read and execute software or firmware instructions stored on a tangible, non-transitory, computer-readable memory (e.g., a magnetic disk, optical disk, random access memory (RAM), read-only memory (ROM), flash memory, etc.). In some embodiments, the software or firmware instructions include machine-readable instructions that, when executed by the processor(s), cause the processor(s) to perform the actions and/or calculations described above in connection with FIG. 2 or FIG. 3.

In an embodiment, the arbiter unit 170 makes LTE uplink denial decisions for the user device 150, and communicates those decisions to LTE transceiver 152. In one embodiment where the user device 150 implements one of the example techniques described above, the user device 150 receives an indication of the maximum number of LTE transmit denial opportunities (n) in a known window of p subframes from an eNB via LTE transceiver 152. In some embodiments, the eNB instead provides a maximum average denial rate (e.g., LTE uplink transmission may be denied up to 10% of all LTE subframes, up to 20% of all LTE subframes, etc.), or other suitable parameter from which n can be derived, and the arbiter unit 170 or another suitable unit in user device 150 calculates n accordingly.

In an embodiment, information needed to calculate the values of $R_i$(denial) and $R_i$(no denial), such as traffic scheduling information, channel state information, and/or other suitable information, is provided to the arbiter unit 170 of user device 150. In the embodiment shown in FIG. 4, for example, LTE uplink channel and/or LTE signaling information is received by the LTE transceiver 152 (e.g., from an eNB), and/or is measured by the LTE transceiver 152, and Wi-Fi receive channel and/or Wi-Fi signaling information is received by the Wi-Fi transceiver 160 (e.g., from a Wi-Fi AP), and/or is measured by the Wi-Fi transceiver 160, before being passed to the arbiter unit 170 for calculation of the various $R_i$ values. In an alternative embodiment, the various $R_i$ values are themselves transmitted to user device 150 (e.g., by a Wi-Fi AP and/or eNB). Once the $R_i$ values are determined (e.g., received and/or calculated) by arbiter unit 170, in an embodiment, the arbiter unit 170 calculates the various values of $U_i(k)$ (e.g., according to Equations 1 and 2, in an embodiment), and uses the values of $U_i(k)$, $R_i$(denial) and $R_i$(no denial) to make the LTE transmission denial decision at each subframe i in the window of p subframes. Indicators of those decisions are provided to a transmitter portion of LTE transceiver 152 in order prevent LTE uplink transmission in the appropriate subframes, in an embodiment. As noted in connection with the example solution 100 of FIG. 3, in some embodiments, various calculated values are used multiple times during the recursive process. In an embodiment, values such as these (e.g., including the sums that are compared against each other in order to make denial decisions) are stored in memory 172 by arbiter unit 170, and retrieved by arbiter unit 170 as needed. In various embodiments, the memory 172 is a volatile or non-volatile memory, such as RAM or ROM, for example.

FIG. 5 is a flow diagram of an example method 200 of determining when to disallow transmissions according to a first communication protocol, according to one embodiment. In some embodiments, the number of times that transmissions can be disallowed within a given time frame is limited. In one embodiment in which the first communication protocol is an LTE protocol, for example, each time period in which transmission can be denied (or not denied) is an LTE subframe, and LTE uplink transmissions can be disallowed in no more than n subframes of a window of p subframes (where n is an integer with 0<n<p). In other embodiments, the first communication protocol is a different, non-LTE protocol, such as UMTS, WiMax, etc.

In an embodiment, the method 200 is implemented in a communication device that is configured to transmit signals conforming to the first communication protocol. In some embodiments, the communication device is a user device (e.g., a smartphone, mobile handset, laptop, tablet device, etc.), such as user device 10 of FIG. 1 or user device 150 of FIG. 4, for example. More specifically, in one embodiment, the method 200 is implemented by one or more processors of an arbiter unit of a communication device, such as arbiter unit 170 of user device 150 in FIG. 4, for example. In some embodiments, the communication device implementing the method 200 is also configured to receive signals conforming to a different, second communication protocol, such as a Wi-Fi or Bluetooth protocol, for example. In other embodiments, however, the communication device implementing the method 200 denies transmissions of the first communication protocol to prevent interference with transmissions and/or receptions by other devices.

At block 210, a first measure of a benefit of disallowing transmission during a first time period within the time frame is determined. In one embodiment, the benefit of disallowing transmission during the first time period includes both an immediate benefit of disallowing transmission during the first time period, and a future benefit of having, for use in a subsequent portion of the time frame, a decremented number of opportunities to disallow transmission. In one embodiment in which the first time period is an i-th time period, for example, the first measure is the quantity $U_{i+1}(k-1+Ri(\text{denial}))$, as discussed above in connection with Equation 1, with $U_{i+1}k-1$ being a measure of the future benefit and $R_i$(denial) being a measure of the immediate benefit. In an embodiment, $U_{i+1}(k-1)$ and $R_i$(denial) are calculated by an arbiter unit such as arbiter unit 170 of FIG. 4, for example.

At block 220, a second measure of a benefit of not disallowing transmission during the first time period is determined. In one embodiment, the benefit of not disallowing transmission during the first time period includes both an immediate benefit of not disallowing transmission during the first time period, and a future benefit of having, for use in a subsequent portion of the time frame, a same (non-decremented) number of opportunities to disallow transmission. In one embodiment in which the first time period is an i-th time period, for example, the second measure is the quantity $U_{i+1}(k)+R_i$(no denial), as discussed above in connection with Equation 1, with $U_{i+1}(k)$ being a measure of the future benefit and $R_i$(no denial) being a measure of the immediate benefit. In an embodiment, $U_{i+1}(k)$ and $R_i$(no denial) are calculated by an arbiter unit such as arbiter unit 170 of FIG. 4, for example.

In some embodiments, the values of $U_{i+1}(k-1)$ and $U_{i+1}(k)$ in blocks 210 and 220, respectively, are calculated as a part of a recursive process, as discussed above in connection with Equations 1 or 2 and in connection with the example solution 100 of FIG. 3. Moreover, in some embodiments, the values of $R_i$(denial) and $R_i$(no denial) in blocks 210 and 220, respectively, are determined in a manner such as that discussed above (e.g., based on known/expected future traffic scheduling, priorities, etc.). In one embodiment in which the communication device implementing the method 200 is also configured to receive signals conforming to a different, second communication protocol, for example, the first measure and/or the second measure is/are determined based at least in part on (1) a benefit of receiving one or more signals conforming to the second communication protocol during the first time period, (2) a benefit of receiving one or more signals conforming to the second communication protocol during one or more time periods in the subsequent portion of the time frame, (3) a benefit of transmitting one or more signals conforming to the first communication protocol during the first time period, and/or (4) a benefit of transmitting one or more signals conforming to the first communication protocol during one or more time periods in the subsequent portion of the time frame.

At block 230, the first measure determined at block 210 is compared to the second measure determined at block 220, and it is determined, based at least in part on that comparison, whether to disallow transmission according to the first communication protocol during the first time period. In an embodiment, a determination is made to disallow transmission at block 230 only if the first measure is greater than, or greater than or equal to, the second measure.

If it is determined at block 230 to disallow the transmission, flow proceeds to block 240. At block 240, the communication device implementing the method 200 is prevented from transmitting according to the first communication protocol during the first time period. In various embodiments, the communication device is prevented from transmitting by sending a command to a transceiver in the communication device, or in some other suitable manner.

If it is determined at block 230 to not disallow the transmission, flow proceeds to block 250. At block 250, the communication device implementing the method 200 is not prevented from transmitting according to the first communication protocol during the first time period. In various embodiments, the communication device is not prevented from transmitting by sending a command (e.g., an enable command) to a transceiver in the communication device, by refraining from sending a command to not transmit (e.g., at a time when the transceiver would otherwise expect such a command), or in some other suitable manner.

In some embodiments, the order of the blocks of method 200 is changed, and/or some of the blocks are performed at least partially in parallel. For example, in one embodiment, the first measure and second measure are calculated (at blocks 210 and 220) substantially in parallel. Moreover, in some embodiments, the method 200 includes additional steps not shown in FIG. 5. In one embodiment, for example, the method 200 includes, prior to blocks 210 and 220, determining (e.g., based on information received from an eNB or other base station) an allowed number of opportunities to disallow transmission according to the first communication protocol. In one such embodiment, the determination of the first measure at block 210 and the determination of the second measure at block 220 are both based in part on the allowed number of opportunities.

At least some of the various blocks, operations, and techniques described above with reference to FIG. 5 may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an ASIC, a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

What is claimed is:

1. A method, implemented in a communication device configured to transmit signals conforming to a first communication protocol, of determining when to disallow transmissions according to the first communication protocol, wherein a number of times that transmissions can be disallowed in a time frame is limited, the method comprising:

determining, at one or more processors, a first measure of a benefit of disallowing transmission during a first time period within the time frame, wherein the benefit of disallowing transmission during the first time period includes (i) an immediate benefit of disallowing transmission during the first time period, and (ii) a future benefit of having, for use in a subsequent portion of the time frame, a decremented number of opportunities to disallow transmission;

determining, at one or more processors, a second measure of a benefit of not disallowing transmission during the first time period, wherein the benefit of not disallowing transmission during the first time period includes (i) an immediate benefit of not disallowing transmission during the first time period, and (ii) a future benefit of having, for use in the subsequent portion of the time frame, a non-decremented number of opportunities to disallow transmission, and wherein the non-decremented number is greater than the decremented number;

determining, at one or more processors, whether to disallow transmission according to the first communication protocol during the first time period at least in part by comparing the first measure to the second measure; and in response to determining to disallow transmission during the first time period, preventing, with one or more processors, the communication device from transmitting according to the first communication protocol during the first time period.

2. The method of claim 1, wherein:

the first time period is an i-th time period of the time frame;

determining the first measure includes calculating a quantity $U_{i+1}(k-1)+R_i$ (denial), where $U_{i+1}(k-1)$ is a measure of the future benefit of having, for use in the subsequent portion of the time frame, the decremented number of opportunities to disallow transmission, where $(k-1)$ is the decremented number, and where $R_i$(denial) is a measure of the immediate benefit of disallowing transmission during the first time period; and determining the second measure includes calculating a quantity $U_{i+1}(k)+R_i$ (no denial), where $U_{i+1}(k)$ is a measure of the future benefit of having, for use in the subsequent portion of the time frame, the non-decremented number of opportunities to disallow transmission, where k is the non-decremented number, and where $R_i$ (no denial) is a measure of the immediate benefit of not disallowing transmission during the first time period.

3. The method of claim 2, wherein determining whether to disallow transmission during the first time period includes determining to disallow transmission during the first time period in response to determining that the first measure is greater than, or greater than or equal to, the second measure.

4. The method of claim 1, wherein:
the communication device is further configured to receive signals conforming to a second communication protocol different than the first communication protocol;
one or both of (i) the first measure and (ii) the second measure is determined based at least in part on one or more of
a benefit of receiving one or more signals conforming to the second communication protocol during the first time period,
a benefit of receiving one or more signals conforming to the second communication protocol during one or more time periods in the subsequent portion of the time frame,
a benefit of transmitting one or more signals conforming to the first communication protocol during the first time period, and
a benefit of transmitting one or more signals conforming to the first communication protocol during one or more time periods in the subsequent portion of the time frame.

5. The method of claim 4, wherein:
the first communication protocol is a Long Term Evolution (LTE) protocol;
the first time period is a first LTE subframe; and
the second communication protocol is either a Wi-Fi protocol or a Bluetooth protocol.

6. The method of claim 1, wherein:
determining the first measure includes determining the first measure based on known future traffic scheduling; and
determining the second measure includes determining the second measure based on the known future traffic scheduling.

7. The method of claim 1, further comprising:
determining, at one or more processors, a third measure of a benefit of disallowing transmission during a second time period within the time frame, wherein the second time period precedes the first time period within the time frame, wherein the benefit of disallowing transmission during the second time period includes (i) an immediate benefit of disallowing transmission during the second time period, and (ii) a future benefit of having, for use in both the first time period and the subsequent portion of the time frame, a twice-decremented number of opportunities to disallow transmission, and wherein the twice-decremented number is greater than the decremented number;
determining, at one or more processors, a fourth measure of a benefit of not disallowing transmission during the second time period, wherein the benefit of not disallowing transmission during the second time period includes (i) an immediate benefit of not disallowing transmission during the second time period, and (ii) a future benefit of having, for use in both the first time period and the subsequent portion of the time frame, the decremented number of opportunities to disallow transmission;
determining, at one or more processors, whether to disallow transmission according to the first communication protocol during the second time period at least in part by comparing the third measure to the fourth measure; and
in response to determining to not disallow transmission during the second time period, allowing, with one or more processors, the communication device to transmit according to the first communication protocol during the second time period.

8. The method of claim 1, wherein:
the method further comprises, prior to determining the first measure and prior to determining the second measure, determining, at one or more processors and based on information received from a base station, an allowed number of opportunities to disallow transmission according to the first communication protocol; and
determining the first measure and determining the second measure are both based in part on the allowed number of opportunities.

9. A communication device comprising:
a first transceiver configured to transmit signals conforming to a first communication protocol;
a second transceiver configured to receive signals conforming to a second communication protocol different than the first communication protocol; and
an arbiter processor unit coupled to (i) the first transceiver and (ii) the second transceiver, wherein the arbiter processor unit is configured to determine when to disallow transmissions according to the first communication protocol, and wherein a number of times that the arbiter processor unit can disallow transmissions in a time frame is limited, the arbiter processor unit being configured to determine when to disallow transmissions at least in part by being configured to
determine a first measure of a benefit of disallowing transmission during a first time period within the time frame, wherein the benefit of disallowing transmission during the first time period includes (i) an immediate benefit of disallowing transmission during the first time period, and (ii) a future benefit of having, for use in a subsequent portion of the time frame, a decremented number of opportunities to disallow transmission,
determine a second measure of a benefit of not disallowing transmission during the first time period, wherein the benefit of not disallowing transmission during the first time period includes (i) an immediate benefit of not disallowing transmission during the first time period, and (ii) a future benefit of having, for use in the subsequent portion of the time frame, a non-decremented number of opportunities to disallow transmission, and wherein the non-decremented number is greater than the decremented number,
determine whether to disallow transmission according to the first communication protocol during the first time period at least by comparing the first measure to the second measure, and
when determining to disallow transmission during the first time period, prevent the first transceiver from transmitting according to the first communication protocol during the first time period.

10. The communication device of claim 9, wherein:
the first time period is an i-th time period of the time frame; and
the arbiter processor unit is configured to
determine the first measure at least by calculating a quantity $U_{i+1}(k-1)+R_i$ (denial), where $U_{i+1}(k-1)$ is a measure of the future benefit of having, for use in the subsequent portion of the time frame, the decremented number of opportunities to disallow transmission, where $(k-1)$ is the decremented number, and where $R_i$(denial) is a measure of the immediate benefit of disallowing transmission during the first time period, and determine the second measure at least by calculating a quantity $U_{i+1}(k)+R_i$(no denial), where $U_{i+1}(k)$ is a measure of the future benefit of having, for use in the subsequent portion of the time frame, the non-decremented number of opportunities to disallow transmission, where k is the non-decremented number, and where $R_i$ (no denial) is a measure of the immediate benefit of not disallowing transmission during the first time period.

11. The communication device of claim 10, wherein the arbiter processor unit is configured to determine whether to disallow transmission during the first time period at least by determining to disallow transmission during the first time period when determining that the first measure is greater than, or greater than or equal to, the second measure.

12. The communication device of claim 9, wherein the arbiter processor unit is configured to determine one or both of (i) the first measure and (ii) the second measure based at least in part on one or more of
   a benefit of receiving one or more signals conforming to the second communication protocol during the first time period;
   a benefit of receiving one or more signals conforming to the second communication protocol during one or more time periods in the subsequent portion of the time frame;
   a benefit of transmitting one or more signals conforming to the first communication protocol during the first time period; and
   a benefit of transmitting one or more signals conforming to the first communication protocol during one or more time periods in the subsequent portion of the time frame.

13. The communication device of claim 9, wherein:
   the first communication protocol is a Long Term Evolution (LTE) protocol;
   the first time period is a first LTE subframe; and
   the second communication protocol is either a Wi-Fi protocol or a Bluetooth protocol.

14. The communication device of claim 9, wherein the arbiter processor unit is configured to:
   determine the first measure based at least on known future traffic scheduling; and
   determine the second measure based at least on the known future traffic scheduling.

15. The communication device of claim 9, wherein:
   the arbiter processor unit is further configured to, prior to determining the first measure and prior to determining the second measure, determine, based on information received from a base station, an allowed number of opportunities to disallow transmission according to the first communication protocol; and
   the arbiter processor unit is configured to (i) determine the first measure, and (ii) determine the second measure, based at least in part on the allowed number of opportunities.

16. A tangible, non-transitory computer-readable medium storing instructions for determining when to disallow transmissions according to a first communication protocol, wherein a number of times that transmissions can be disallowed in a time frame is limited, and wherein the instructions, when executed by one or more processors, cause the one or more processors to:
   determine a first measure of a benefit of disallowing transmission during a first time period within the time frame, wherein the benefit of disallowing transmission during the first time period includes (i) an immediate benefit of disallowing transmission during the first time period, and (ii) a future benefit of having, for use in a subsequent portion of the time frame, a decremented number of opportunities to disallow transmission;
   determine a second measure of a benefit of not disallowing transmission during the first time period, wherein the benefit of not disallowing transmission during the first time period includes (i) an immediate benefit of not disallowing transmission during the first time period, and (ii) a future benefit of having, for use in the subsequent portion of the time frame, a non-decremented number of opportunities to disallow transmission, and wherein the non-decremented number is greater than the decremented number;
   determine whether to disallow transmission according to the first communication protocol during the first time period at least by comparing the first measure to the second measure; and
   when determining to disallow transmission during the first time period, prevent a communication device from transmitting according to the first communication protocol during the first time period.

17. The tangible, non-transitory computer-readable medium of claim 16, wherein:
   the first time period is an i-th time period of the time frame;
   the instructions cause the one or more processors to determine the first measure at least by calculating a quantity $U_{i+1}(k-1)+R_i$(denial), where $U_{i+1}(k-1)$ is a measure of the future benefit of having, for use in the subsequent portion of the time frame, the decremented number of opportunities to disallow transmission, where (k−1) is the decremented number, and where $R_i$(denial) is a measure of the immediate benefit of disallowing transmission during the first time period; and
   the instructions cause the one or more processors to determine the second measure at least by calculating a quantity $U_{i+1}(k)+R_i$(no denial), where $U_{i+1}(k)$ is a measure of the future benefit of having, for use in the subsequent portion of the time frame, the non-decremented number of opportunities to disallow transmission, where k is the non-decremented number, and where $R_i$(no denial) is a measure of the immediate benefit of not disallowing transmission during the first time period.

18. The tangible, non-transitory computer-readable medium of claim 17, wherein the instructions cause the one or more processors to determine whether to disallow transmission during the first time period at least by determining to disallow transmission during the first time period when determining that the first measure is greater than, or greater than or equal to, the second measure.

19. The tangible, non-transitory computer-readable medium of claim 16, wherein the instructions cause the one or more processors to determine one or both of (i) the first measure and (ii) the second measure based at least in part on one or more of:
   a benefit of receiving one or more signals conforming to a second communication protocol, different than the first communication protocol, during the first time period;
   a benefit of receiving one or more signals conforming to the second communication protocol during one or more time periods in the subsequent portion of the time frame;
   a benefit of transmitting one or more signals conforming to the first communication protocol during the first time period; and a benefit of transmitting one or more signals conforming to the first communication protocol during one or more time periods in the subsequent portion of the time frame.

20. The tangible, non-transitory computer-readable medium of claim 19, wherein:

the first communication protocol is a Long Term Evolution (LTE) protocol;
the first time period is a first LTE subframe; and
the second communication protocol is either a Wi-Fi protocol or a Bluetooth protocol.

* * * * *